United States Patent [19]

Röhm

[11] 4,411,568
[45] Oct. 25, 1983

[54] COLLET-TYPE CHUCK

[76] Inventor: Günter H. Röhm,
Heinrich-Röhm-Strasse 50, 7927
Sontheim, Fed. Rep. of Germany

[21] Appl. No.: 265,466

[22] Filed: May 20, 1981

[30] Foreign Application Priority Data

May 24, 1980 [DE] Fed. Rep. of Germany ... 8014064[U]

[51] Int. Cl.³ .......................... B23C 5/26; B23B 31/10
[52] U.S. Cl. .................................. 409/233; 408/239 R
[58] Field of Search .................... 409/233, 232, 234; 408/239 A, 239 R; 279/4

[56] References Cited

U.S. PATENT DOCUMENTS

| | | | |
|---|---|---|---|
| 4,068,559 | 1/1978 | Schmid, Jr. et al. | 409/233 |
| 4,131,054 | 12/1978 | Johnson | 409/233 |
| 4,290,720 | 9/1981 | Ferreira | 409/233 |
| 4,352,612 | 10/1982 | Benatti | 409/233 |

FOREIGN PATENT DOCUMENTS

| | | | |
|---|---|---|---|
| 23197 | 1/1981 | European Pat. Off. | 409/233 |
| 7706193 | 2/1982 | Fed. Rep. of Germany | 409/233 |
| 145606 | 12/1980 | German Democratic Rep. | 409/233 |
| 509354 | 4/1976 | U.S.S.R. | 409/233 |
| 197712 | 12/1977 | U.S.S.R. | 409/233 |

*Primary Examiner*—William R. Briggs
*Attorney, Agent, or Firm*—Karl F. Ross; Herbert Dubno

[57] ABSTRACT

A chuck has a chuck body adapted to be rotated about an axis and formed centered on the axis with a forwardly open tool-receiving seat. A holding element is displaceable axially in the body between a rear holding position securing a tool in the seat and a front releasing position permitting the tool to be inserted backwardly into and withdrawn forwardly from the seat, with a holding spring urging the element backwardly into the holding position. A piston axially coupled to the holding element has an axially backwardly directed piston face exposed in a chamber formed between this axially backwardly directed face and the forwardly directed face of an actuating member that is urged axially forwardly by a locking spring. A plurality of locking balls are displaceable radially but not axially in the chuck between radially inner locking positions engaged in a groove in the piston and radially outer positions engaged in a groove in the actuating member. This groove of the actuating member is only aligned with the balls when the actuating member is displaced axially backwardly by pressurization of the chamber to allow the balls to move radially outwardly out of the groove of the piston, thereby freeing the piston and holding element for axial displacement in the chuck.

10 Claims, 3 Drawing Figures

COLLET-TYPE CHUCK

FIELD OF THE INVENTION

The present invention relates to a chuck. More particularly this invention concerns a chuck of the collet or quick-connect and -disconnect type used to hold tools whose shanks or shafts are tapered.

BACKGROUND OF THE INVENTION

A collet-type chuck is known, as for example from my German Utility Model No. 7,706,193, which has a chuck body adapted to be rotated about an axis and formed centered on this axis with a forwardly open tool-receiving seat normally of frustoconically tapered shape. A holding element is displaceable axially in this body between a rear holding position securing an appropriately tapered tool shank in the seat and a front releasting position permitting the tool to be inserted backwardly into and withdrawn forwardly from the seat. At least one holding spring is braced between the chuck body and the holding element for urging the holding element axially backwardly into the holding position.

This holding element in turn can be displaced axially forwardly to release the tool by hydraulic pressurization of a chamber formed between a rear surface of the holding member and the chuck body. Thus when the forwardly effective hydraulic pressure exceeds the backwardly effective spring force, the holding element moves forwardly to release the tool gripped by the holding element in the seat.

The problem with such a chuck is that if any axially forwardly effective force on the tool exceeds the spring force of the holding spring, the tool can be pulled out of its seat. Thus if the tool gets caught in a workpiece it can be jerked out of the chuck. Increasing the spring force makes this type of accident less likely to occur, but requires the chuck to be built more strongly and requires more hydraulic force to be employed to release the tool.

It has been suggested to provided a wedge arrangement that is axially effective between the holding spring and the piston on the holding element. Such an arrangement is disadvantageous when the holding element is used not only to secure the tool in the seat, but also to pull the tool back into the chuck since the wedge arrangement decreases the effective stroke of the piston on the holding element. In addition the extremely high axial forces exerted by such an arrangement frequently lead to deformation of the chuck body and overloading of the bearings carrying the chuck.

OBJECTS OF THE INVENTION

It is therefore an object of the present invention to provide an improved collet-type chuck.

Another object is the provision of such a chuck wherein the tool is held securely against unintentional axial withdrawal, but wherein excessive axial forces need not be exerted by or through the holding element.

SUMMARY OF THE INVENTION

These objects are attained according to the instant invention in a chuck of the above-described general type, but wherein at least one locking organ is provided which is radially displaceable only in the holding position of the holding element between a locking position retaining the holding element in the holding position against axial displacement in the body and a freeing position out of locking engagement with the holding element and permitting axial displacement of the holding element in the chuck body. Means is provided including an actuating member exposed in the chamber at the piston of the holding element for displacing the actuating member into the freeing position on pressurization of this chamber. At least one locking spring is provided which is braced between the actuating member and the chuck body and which is effective through the actuating member on the locking element to urge same into the locking position.

Thus according to the instant invention the holding element is positively mechanically locked in the holding position so that even if an axially forwardly effective tractive force is applied to the tool held by the holding element which is greater than the axially backwardly effective force exerted by the holding spring, the holding element will not move forwardly and release the tool.

According to further features of this invention the chuck body includes an axially fixed and radially extending guide for the locking organ which is radially displaceable in the guide between a radially inner portion constituting the locking position and a radially outer position constituting the freeing position. Normally the locking organ is formed as a ball and in fact a plurality of such balls are angularly equispaced about the axis.

In accordance with another feature of this invention the actuating member has a forwardly directed face forming the pressurizable chamber with the backwardly directed piston face of the holding element. Thus pressurization of this chamber urged the actuating member axially backwardly and the piston axially forwardly. With this type of system even a sudden jarring of the chuck cannot open it, since the holding element and actuating member must move axially oppositely, and the locking organ must move radially to release tool. Obviously such a combination of forces could not be brought to bear accidentally.

The chuck-body guide according to this invention is formed as a sleeve in which the locking-element piston is slidable. This sleeve has a radially throughgoing hole or window in which the locking-organ ball is radially displaceable between a radially outer position constituting the freeing position and a radially inner position constituting the locking position. The actuating member itself is displaceable between an axially forwardly advanced position urging the ball into the locking position and an axially backwardly retracted position permitting the ball to move into the freeing position.

According to yet another feature of this invention the guide or cage sleeve forming part of the chuck body has a radial thickness smaller than the ball diameter and the chuck body is formed with a radially open recess alignable with and capable of at least partially receiving the ball in the retracted position of the actuating member. The holding element itself is formed with a radially outwardly open recess axially level in the holding position with the guide window and the ball is at least partially receivable in this outwardly open recess. The actuating member is therefore formed as a sleeve snugly and axially slidably surrounding the cage or guide sleeve.

The inwardly and outwardly open recesses of the chuck body and piston, respectively, are formed as grooves which are axially level with each other only in the holding position of the holding element and the retracted position of the actuating member. The actuating member itself is formed axially immediately behind the respective inwardly open recess or groove with a frustoconical camming surface tapered axially backwardly. The taper angle of this camming surface is smaller than the limit angle for sliding friction between the locking ball and the actuating member.

With the system according to the instant invention, therefore, pressurization of the chamber first pushes the actuating member back into the retracted position, permitting the ball to move radially out into the freeing position, which in turn permits the holding element to move forward into the releasing position. After the tool has been removed from the chuck and another has been inserted into it, the pressure is relieved so that the holding element is pulled back by its spring, then the spring pushes the actuating member forward to push the locking balls radially inwardly to lock the holding element in place.

SPECIFIC DESCRIPTION

Figure 1:
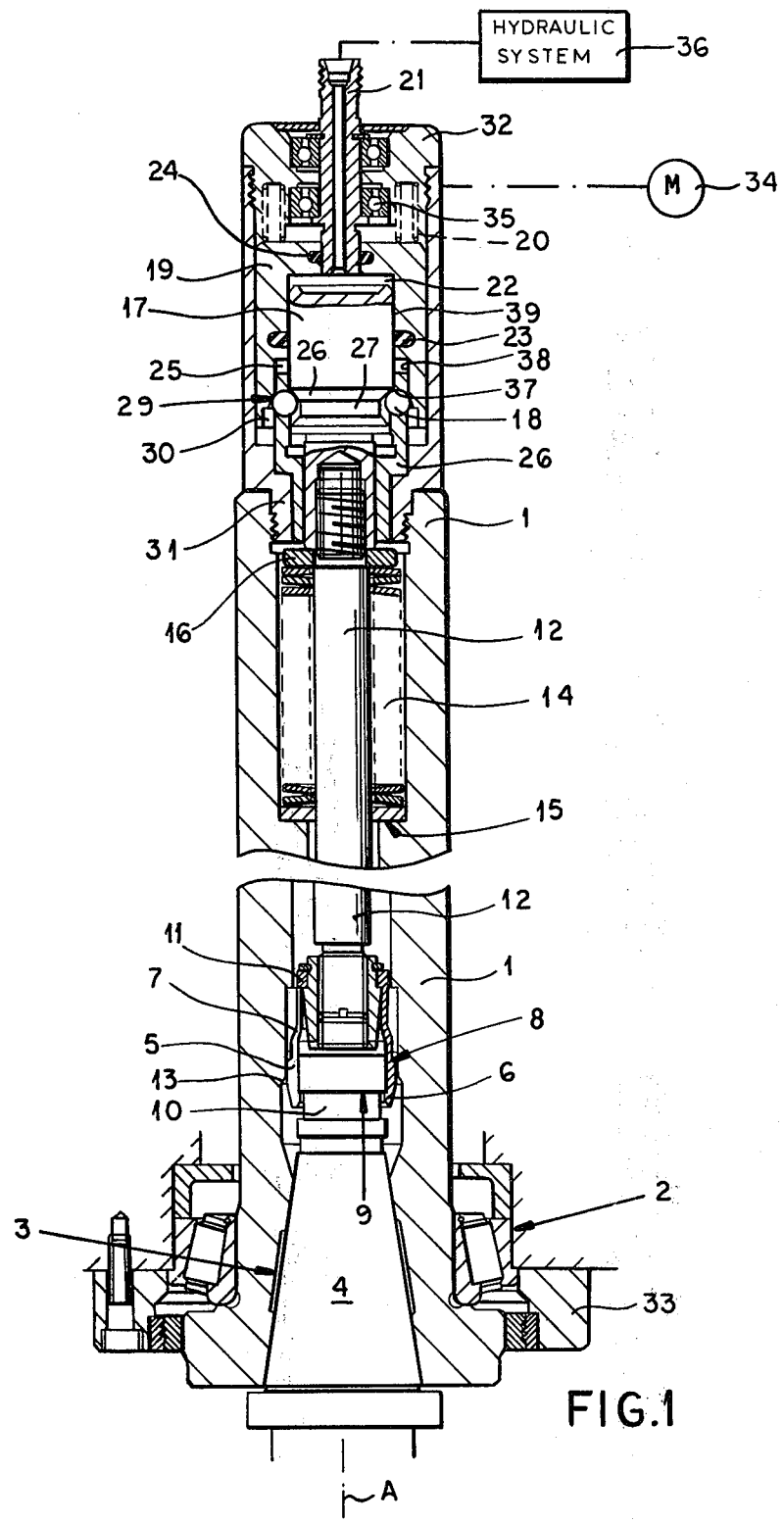
FIG. 1 is an axial section through a chuck according to the instant invention.

As seen in FIG. 1 a tool holder or collet-type chuck according to the instant invention has a chuck body formed in part by a spindle 1 centered on an axis A and supported by means of a roller bearing 2 in a lathe frame 33 and normally rotated by a motor indicated schematically at 34 about the axis A. This spindle 1 is formed centered on the axis A with an axially forwardly tapered frustoconical seat 3 into which the complementarily tapered shank 4 of a tool can fit. The chuck body further comprises a sleeve 31 screwed into the back end of the spindle 1 and a cap 32 screwed into the back end of the sleeve 31.

A coupling sleeve 5 that is axially displaceable in the spindle 1 has claws 6 that are formed on the end of axially forwardly extending tongues 7 extending from a base ring 11 of the sleeve 5. These claws 6 can engage radially inwardly over an axially forwardly directed shoulder 9 of a groove 10 formed in the tool shank 4. The radial outer surfaces 8 of the claws 6 lie in the coupling or holding position of FIG. 1 radially outwardly against an inwardly projecting ridge 13 formed in the central bore of the tubular spindle 1.

Screwed into the base ring 11 of the sleeve 5 is an actuating rod 12 surrounded by a stack of Belleville washers 14 braced axially forwardly against a shoulder 15 of the bore of the spindle 1 and axially backwardly against a heavy-duty snap ring 16 fixed on the rod 12. Thus these spring washers 14 urge the rod 12 axially backwardly.

The actuating rod 12 in turn is screwed at its rear end into a piston 17 slidable in an actuating member constituted as a tubular counter piston 19 and defining therewith a pressurizable chamber 22. A seal ring 23 is provided between the pistons 17 and 19. Springs 20 urge the piston 19 axially forwardly, thereby diminishing the volume of the chamber 22. An inlet fitting 21 supported by bearings 35 in the cap 32 extends on the axis A through the counter piston 19 into the chamber 22 and is sealed by a ring 24 with respect to the piston 19. A pump and source of hydraulic liquid form a hydraulic system 36 connected to the fitting 21 to pressurize the chamber 22.

The chuck body further comprises a cage or ball guide 26 formed as a sleeve snugly that surrounds the front portion of the piston 17 and that is received in a radially inwardly open recess 25 of the outer counter piston 19. This ball guide 26 is braced axially forwardly against the sleeve 31 of the chuck body and is formed with a plurality of angularly equispaced and radially throughgoing cylindrical holes or windows 37 each of which receives a respective ball 18 of a diameter substantially greater than the radial thickness of the sleeve guide 26, so that the balls 18 will stick radially out of the respective holes to one side or the other.

The piston 17 is formed with a radially outwardly open trapezoidal-section groove 27 in which the balls 18 are partially receivable and that has forwardly and backwardly tapered frustoconical front and rear flanks 28. In addition the extreme forward end of the tubular counter piston 19 is formed with a radially inwardly open groove 30 in which the balls 18 are receivable, and is formed axially behind this groove 30 with a forwardly tapered frustoconical surface 29 whose forward edge lies radially outside the centers of the balls 18 even when same are fully engaged in the grooves 30 and which has an angle relative to the axis A which is smaller than the limit angle for sliding friction between the piston 19 and balls 18. Otherwise the piston 19 has a cylindrical inner surface 38 which can only axially overlap the holes 36 when the balls 18 are pushed radially inwardly therefrom into the groove 27. Similarly the piston 17 has a cylindrical outer surface 39 which can only axially overlap the holes 36 when same are aligned with the groove 30 and the balls 18 are pushed into the groove 27. In other words the balls 18 must project from the bores 36 either into the groove 27 or into the groove 30.

Figure 3:
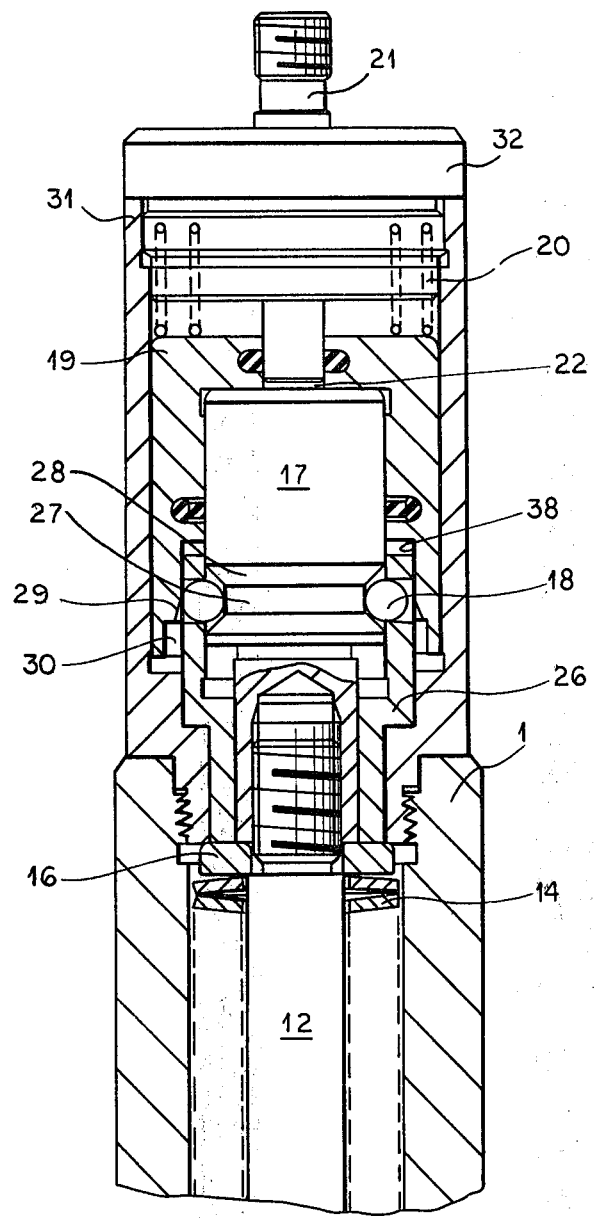
FIG. 3 is a view similar to that of FIG. 2 but in the holding position.

During normal operation of the system according to the instant invention the chamber 22 is depressurized. The springs 13 therefore push the rod 12 backwardly to pull the claws 6 back against the shoulder 9 of the tool shank 4. In addition as shown in FIG. 3 the springs 20 push the piston 19 forwardly so that the balls 18 are cammed by the surface 29 through the holes 36 into the groove 27 and are prevented from outward movement by engagement with the inner surface 38 of the sleeve 19. An axially forwardly effective force on the tool 4, even if it is greater than the axially backwardly effective force of the spring washers 14, will not be able to displace the rod 12 forwardly because the balls 18 are engaged in its groove 27 and themselves cannot move radially outwardly or axially forwardly. Thus the tool 4 is locked in place.

Figure 2:
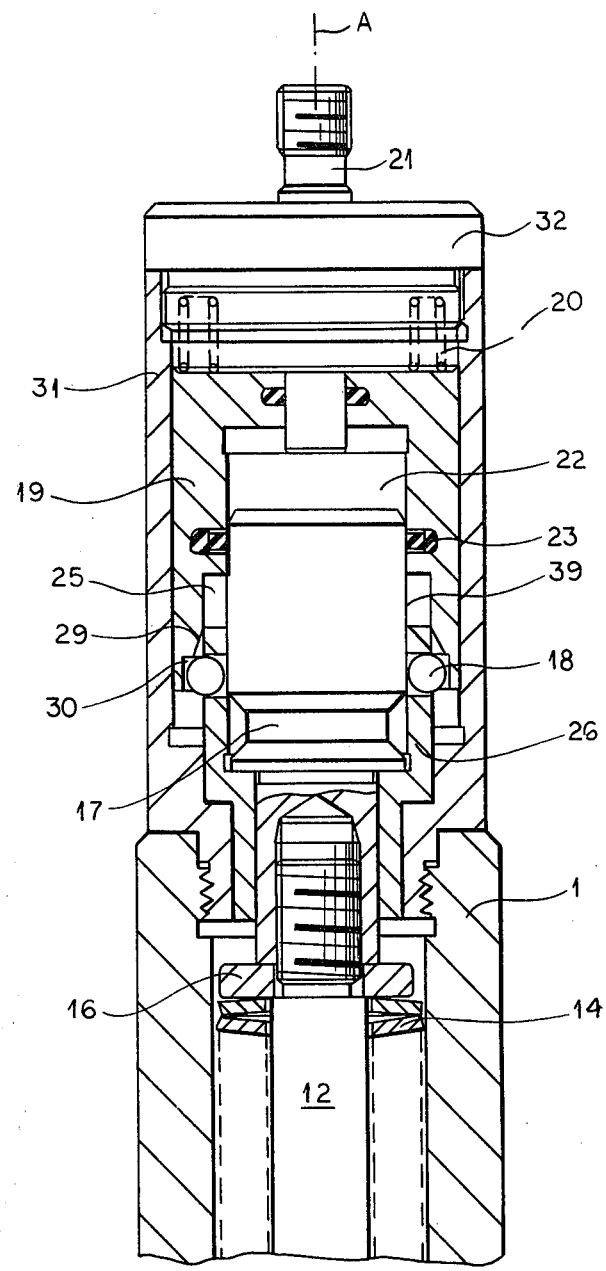
FIG. 2 is a large-scale view of a detail of FIG. 1 in the releasing position.

In order to free the tool 4 from the collet chuck according to the instant invention the chamber 22 is pressurized. Such pressurization will at first drive the piston 19 axially backwardly as shown in FIG. 2. This allows the balls 18 to move radially outwardly into the groove 30. The piston 17 can then move axially forwardly with the rod 12 to push the outer surfaces 13 of the claws 6 off the ridge 8. The tool shank 4 therefore will be released.

Thus with the system according to the instant invention the tool is positively held in the chuck. Even if the force exerted axially forwardly on the tool exceeds the axially backwardly effective force of the springs 14, the tool will remain locked in place. As a result it is not necessary to use very heavy-duty springs 14 to ensure good holding of the tool. Furthermore the rod 12 can have a relatively long stroke so that the claws 6 can be extended axially forwardly to grip a tool and then pull it back into the taper seat 4.

I claim:

1. A chuck comprising:
   means including a chuck body adapted to be rotated about an axis and formed centered on said axis with a forwardly open tool-receiving seat;
   means including a holding element mounted in said body for axial displacement therein between a rear holding position securing a tool in said seat and a front releasing position permitting a tool to be inserted backward into and withdrawn forward from said seat;
   at least one holding spring braced between said holding element and said body and urging said holding element axially backward into said holding position;
   a piston axially coupled to said holding element and having an axially backwardly directed piston face;
   means for exerting hydraulic pressure axially forward against said face and thereby urging said holding element axially forward into said releasing position;
   at least one locking organ displacable in said holding position of said holding element between a locking position retaining said holding element in said holding position against axial displaceament in said body and a freeing position out of locking engagement with said holding element and permitting axial displacement of said holding element in said body;
   means including an actuating member engageable with said locking organ for displacing same into said freeing position on pressurization at said piston face; and
   at least one locking spring engaging said actuating member and urging said locking organ into said locking position.

2. The chuck defined in claim 1 wherein said chuck body includes an axially fixed and radially extending guide for said locking organ, said locking organ being radially displaceable in said guide between said locking and freeing positions.

3. The chuck defined in claim 2 wherein said actuating member has a forwardly directed face forming a chamber with said backwardly directed face of said piston, said locking spring urging said actuating member axially forwardly, whereby pressurization of said chamber urges said actuating member axially backwardly and said piston axially forwardly.

4. The chuck defined in claim 3 wherein said locking organ is a ball.

5. The chuck defined in claim 3 wherein said actuating member is displaceable between an axially forwardly advanced position urging said organ into said locking position and an axially backwardly retracted position permitting said organ to move into said freeing position.

6. The chuck defined in claim 5 wherein said chuck body is formed with a radially inwardly open recess alignable with and capable of at least partially receiving said organ in said retracted position of said actuating member.

7. The chuck defined in claim 6 wherein said holding element is formed with a radially outwardly open recess axially level in said holding position with said guide and in which said organ is at least partially receivable.

8. The chuck defined in claim 6 wherein said organ is a ball and said guide is a cage sleeve formed with a throughgoing window of radial thickness smaller than the diameter of said ball, said piston being slidable within said sleeve and said actuating member being formed as a sleeve snugly and axially slidable surrounding said cage sleeve.

9. The chuck defined in claim 8 wherein said actuating member is formed axially immediately behind said radially inwardly open recess with a frustoconical camming surface tapered axially backwardly.

10. The chuck defined in claim 8 wherein a plurality of such balls are angularly equispaced about said axis, said inwardly open recess being a groove and said outwardly open recess also being a groove.

* * * * *